United States Patent
Khalil

(10) Patent No.: US 6,526,780 B1
(45) Date of Patent: Mar. 4, 2003

(54) METHOD OF MANUFACTURING A CATHODE RAY TUBE

(75) Inventor: Mohammed Khalil, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 158 days.

(21) Appl. No.: 09/638,553

(22) Filed: Aug. 14, 2000

(30) Foreign Application Priority Data

Aug. 13, 1999 (EP) .............................................. 99202634

(51) Int. Cl.$^7$ .............................................. C03B 23/00
(52) U.S. Cl. ............................... 65/64; 65/103; 65/348; 65/356
(58) Field of Search ........................... 65/29.19, 63, 64, 65/103, 104, 114, 117, 162, 348, 356

(56) References Cited

U.S. PATENT DOCUMENTS

| | | | |
|---|---|---|---|
| 2,314,812 A | 3/1943 | Blau et al. ...................... | 49/79 |
| 2,357,993 A | 9/1944 | Blau et al. ...................... | 49/14 |
| 3,419,371 A | 12/1968 | Lehr et al. ..................... | 65/114 |
| 3,473,909 A * | 10/1969 | Bennett et al. ................ | 65/106 |
| 3,484,225 A | 12/1969 | Bognar .......................... | 65/103 |
| 3,507,639 A * | 4/1970 | Seymour ....................... | 65/104 |
| 5,053,069 A * | 10/1991 | Vanaschen et al. ........... | 65/106 |
| 5,290,999 A * | 3/1994 | Kuster et al. ................ | 219/388 |
| 5,938,810 A * | 8/1999 | De Vries et al. .............. | 65/103 |

FOREIGN PATENT DOCUMENTS

| | | |
|---|---|---|
| DE | 1496016 | 2/1969 |
| EP | 0404676 A1 | 12/1990 |
| EP | 0512922 A2 | 11/1992 |
| EP | 1008562 A2 | 6/2000 |
| FR | 2690434 A1 | 10/1993 |
| GB | 1127591 * | 9/1968 |

* cited by examiner

Primary Examiner—Sean Vincent
(74) Attorney, Agent, or Firm—Aaron Waxler

(57) ABSTRACT

To increase the strength of the glass panel of a CRT, the temperature of the glass panel is reduced during reforming from a temperature above, preferably at least 30° C. above the annealing point, to a temperature well below, preferably at least 80° C. below the strain point. This induces high surface compression in the glass panel, paired with a low rate of compaction. The glass panel is subsequently not subjected to the usual annealing step.

6 Claims, 3 Drawing Sheets

METHOD OF MANUFACTURING A CATHODE RAY TUBE

BACKGROUND OF THE INVENTION

The invention relates to a method of manufacturing a cathode ray tube, in which method a glass display panel is press-formed, reheated and subsequently reformed.

Such a method is known from U.S. Pat. No. 3,484,225. In the known method, a glass panel is press-formed, which usually takes place at very high temperatures (1000° C.–1100° C.), whereafter the panel is reheated above the strain point temperature of the glass and reformed in a reforming apparatus.

In this manner, a glass face panel can be precisely formed.

CRTs are becoming increasingly larger in size and weight. Furthermore, the front surface of the glass panel is becoming increasingly flatter. However, in general, an increase of the flatness of the front surface of the face panel also increases the weight of the glass panel, because the thickness of the glass panel has to be increased to ensure safety against implosion or explosion of the CRT.

Therefore, there is a great need for increasing the strength of the CRT and in particular of the glass panel.

The present invention aims at providing a method which allows an increase of the resistance of the face panel against damage and/or a reduction of the weight of the glass panel.

To this end, the method in accordance with the invention is characterized in that, prior to reforming, the glass panel is reheated to a temperature above the annealing point and, during reforming, the temperature of the glass panel is reduced to a temperature below the strain point and the face panel is not subsequently annealed.

Typically, the annealing point of glass is at approximately 525° C. to 560° C., the strain point being some 30° C.–70° C. lower. In the known method, the face panel is reformed at a temperature at or above the annealing temperature. After forming the glass panel, the glass panel is usually annealed to remove stresses.

SUMMARY OF THE INVENTION

In the method in accordance with the invention, the reforming method step takes place while the temperature of the glass panel is reduced from a first temperature above the annealing point to a second temperature below the strain point. During reforming, this reduction of temperature induces a high surface compression in the glass panel. As the glass panel is not subsequently subjected to an annealing step, as is usual, this high surface-compressive state of the glass panel is preserved. The method provides a number of advantages.

The high surface-compressive state greatly increases the resistance of the glass panel to implosion, thus increasing the safety of the CRT and/or allowing a reduction of the weight of the glass panel and the CRT as a whole. An annealing step is not necessary, and indeed unwanted, which reduces the manufacturing costs and the energy needed for manufacturing the CRT. Furthermore, although the glass panel is in a high surface-compressive state, the glass of the glass panel has a relatively low degree of compaction. During manufacture of the CRT, the glass panel is subjected to temperature and thermal expansion fluctuations. These thermal expansion fluctuations lead to stresses and deformations of the panel, which lead to a reduction of quality of the image displayed on the display screen of the CRT. The lower the degree of compaction, the less these detrimental effects occur. Therefore, by providing a glass panel having a relatively low degree of compaction, the method provides an improved image quality.

Preferably, the second temperature is at least 80° C. below the strain point. Such a low temperature ensures that the high compressive state and the low degree of compaction are preserved and are not relaxed appreciably after reforming. In this respect, it is remarked that temperature differences may occur within the glass panel, more particularly in the innermost part of the glass panel which is at a higher temperature than the second temperature, the temperature at the surface of the glass panel.

Preferably, the first temperature is at least 30° C. above the annealing temperature. If the first temperature is lower, the resistance of the glass panel against reforming increases, increasing the pressure needed for reforming.

Preferably, the reduction of temperature is effected within 5 minutes. If the reduction of temperature takes longer, the degree of compaction of the glass panel will increase and the surface-compressive stresses will decrease.

Preferably, the reforming step is performed in a reforming press held at or below the second temperature to bring the glass panel to the second temperature. The reforming press is preferably maintained at such a temperature, which requires less energy than in embodiments in which the temperature of the reforming press fluctuates.

Preferably, the reforming press is provided with means to increase heat transfer from the glass panel to the reforming press. The higher the rate of transfer of heat, the faster the temperature of the glass panel drops and the higher compressive stresses may be obtained in the glass panel.

A metal cloth provided between the dies of the press and the glass panel increases, for instance, the heat transfer. Such means also provide some protection for the dies of the reforming press reducing the temperature gradients in the contact layer of the die with the glass panel.

These and other aspects of the invention are apparent from and will be elucidated with reference to the embodiments described hereinafter.

DESCRIPTION OF THE PROFFERED EMBODIMENTS

Figure 1:
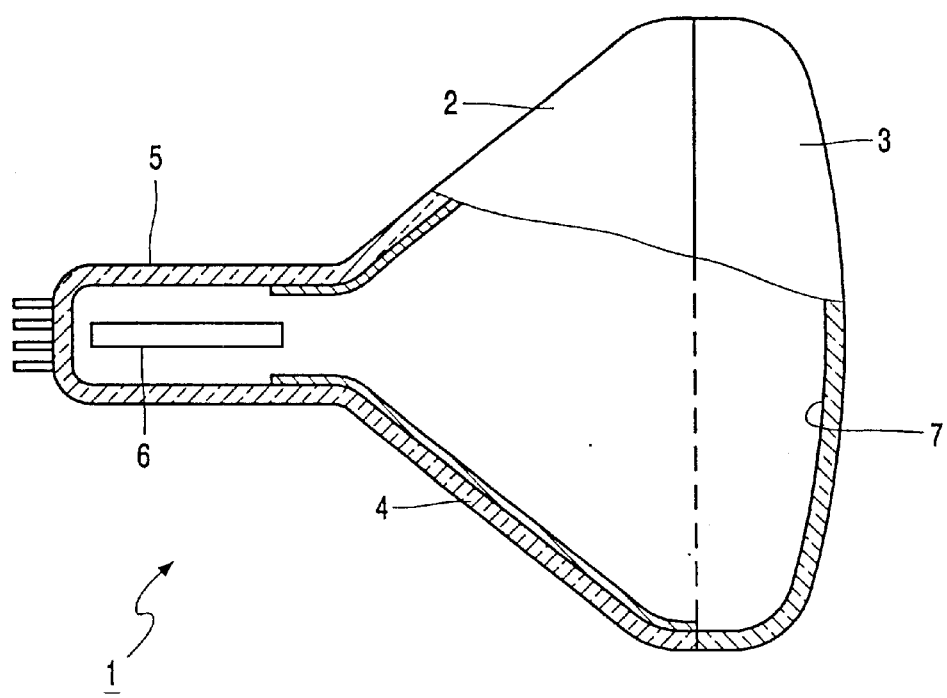
FIG. 1 is a schematic view, partly cutaway, of a display device comprising a cathode ray tube.

The Figures are purely schematic and not drawn to scale. In particular, some dimensions are exaggerated strongly for the sake of clarity. In the Figures, like reference numerals refer to like parts, whenever possible.

FIG. 1 is a very schematic, cut-away view of a display device comprising a cathode ray tube 1 having a glass envelope 2 which includes a display panel 3, a cone 4 and a neck 5. The neck 5, accommodates is an electron gun 6 for generating one or more electron beams. The electron beam is focused on a phosphor layer 7 on the inner surface of the display panel 3 and deflected across the display panel 3 in two mutually perpendicular directions by means of a deflection coil system (not shown in FIG. 1).

Display devices often comprise cathode ray tubes or television display tubes 1 which are entirely made of glass and are built up of two or more portions with glass walls of different thicknesses or different heat-absorption characteristics. For example, a glass television display tube 1 customarily comprises a glass display panel 3 and a glass cone 4 which are separately produced and subsequently united by fusing or using a (solder) glass frit, the joint formed being hermetically tight. The display panel 3 of such tubes is formed by a glass wall whose thickness is much greater than the wall thickness of the cone parts of such tubes. Such a greater wall thickness of the display panel 3 ensures that it is sufficiently rigid when the eventual tubes comprising such a screen are evacuated.

Figure 2:
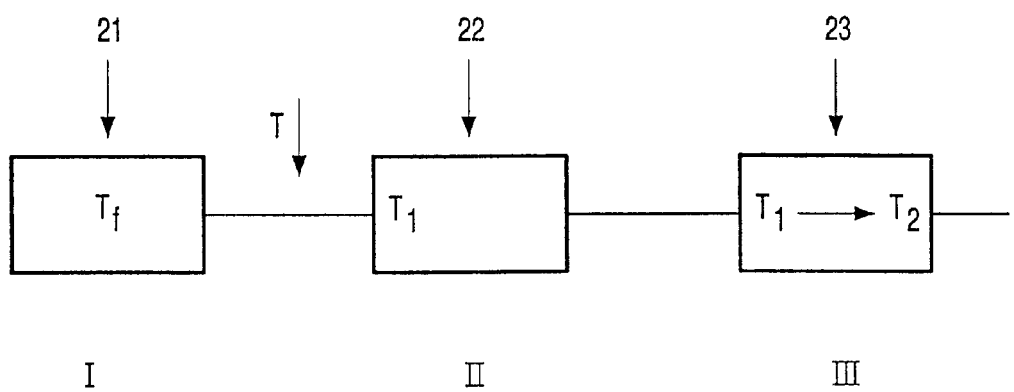
FIG. 2 illustrates the method in accordance with the invention.

FIG. 2 illustrates the method in accordance with the invention. In a first method step I, a glass volume at a high temperature is supplied to a press having moulds whose forms roughly correspond to the form of the glass panel to be made. A glass panel is press-formed in the usual manner and the temperature of the glass panel drops as the formed glass panel is taken from the press. The temperature is thereafter increased in a conditioning lehr or oven 22 at a first temperature $T_1$. (method step II) Thereafter, the glass panel is placed in a reforming press which is at or below a second lower temperature $T_2$. During reforming of the glass panel, the temperature of the glass panel drops sharply to $T_2$ or close to $T_2$, at least for the surfaces which are in contact with the reforming press (method step III). Said temperature is substantially below (e.g. at least 80° C. below) the strain temperature. As the temperature of the glass panel drops, a high surface-compressive state, but a low degree of compaction, arises in the glass panel, leading to an increased strength of the glass panel. At a strength comparative to hitherto known and required strengths, this enables the glass panel to have a reduced thickness, and thus a reduced weight of the CRT.

Figure 3:
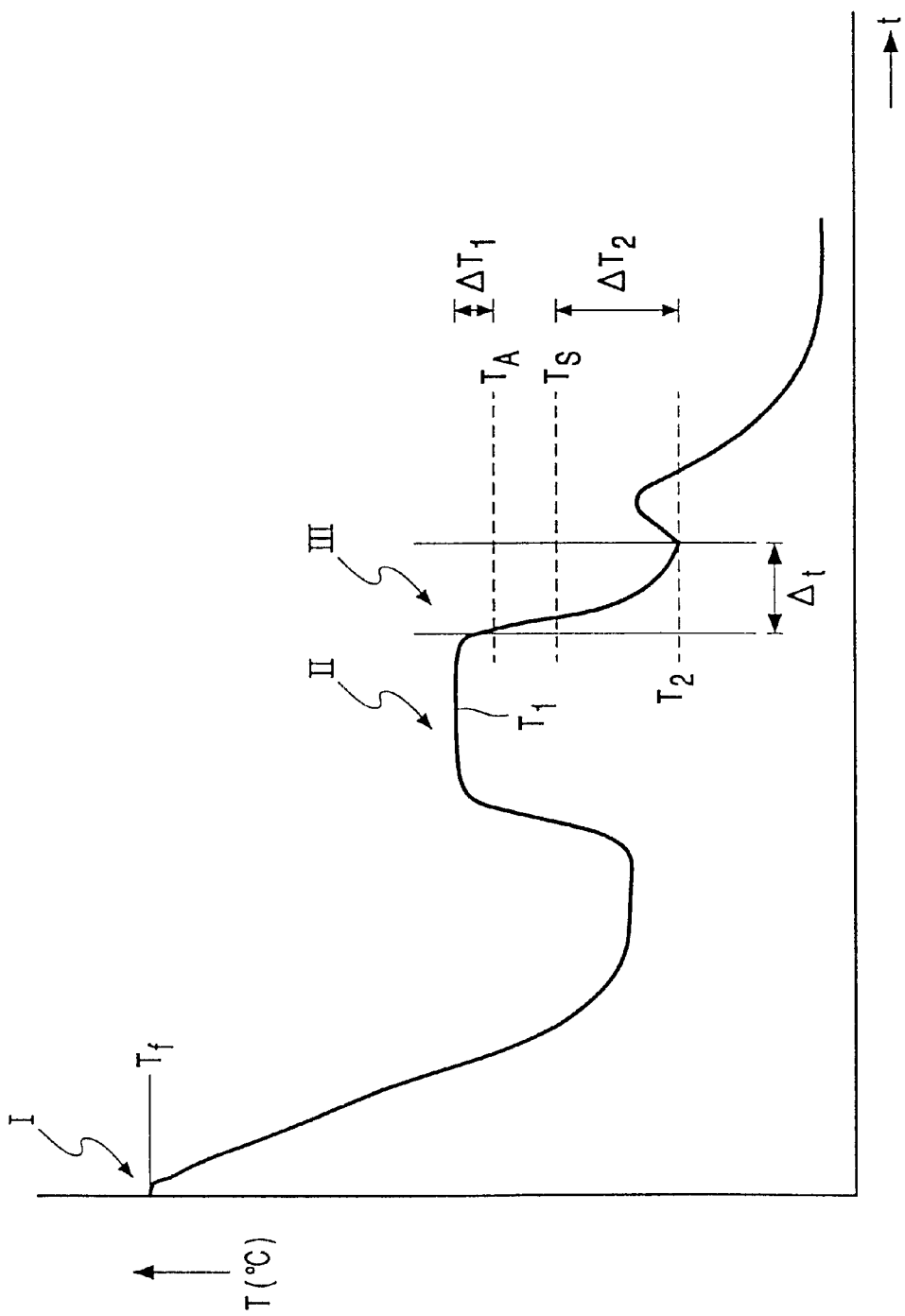
FIG. 3 illustrates, in a graphical form, the temperature of the glass panel during the various steps of the method in accordance with the invention.

FIG. 3 illustrates the temperature of the glass panel during manufacture in accordance with the invention.

The glass panel is formed (step I) at a high temperature $T_f$, typically of the order of 1000° C.–1100° C. Thereafter, the glass panel cools down, and is reheated (step II) to a first temperature $T_1$, which temperature lies above the annealing temperature $T_a$, the difference $\Delta T_1 = T_1 - T_a$ being preferably more than 30° C. Subsequently, the glass panel is reformed (step III), during which reforming the temperature is reduced to a second temperature $T_2$, well below the strain point $T_s$. The difference $\Delta T_2 = T_{s-T2}$ is preferably more than 80° C. Thereafter, the glass panel is not annealed, the temperature staying below or at least not rising substantially above $T_s$. The temperature $T_2$ is the temperature of the outer and inner surfaces of the glass panel. When the glass panel is taken out of the reforming press, the temperature increases due to reheating effects caused by the fact that the innermost part of the glass panel is still at a higher temperature. This is illustrated in FIG. 3 by a temporary increase of temperature after method step III, indicated in FIG. 3 by a hump in the temperature curve. The temperature $T_2$ is so far below the strain point Ts that the maximum of the temporary increase of temperature stays below and preferably well below (at least 30° C.) the strain point to prevent relaxation of the high surface compression induced in step III.

The temperature is reduced in a time period $\Delta t$, which is preferably less than 5 minutes.

Figure 4:
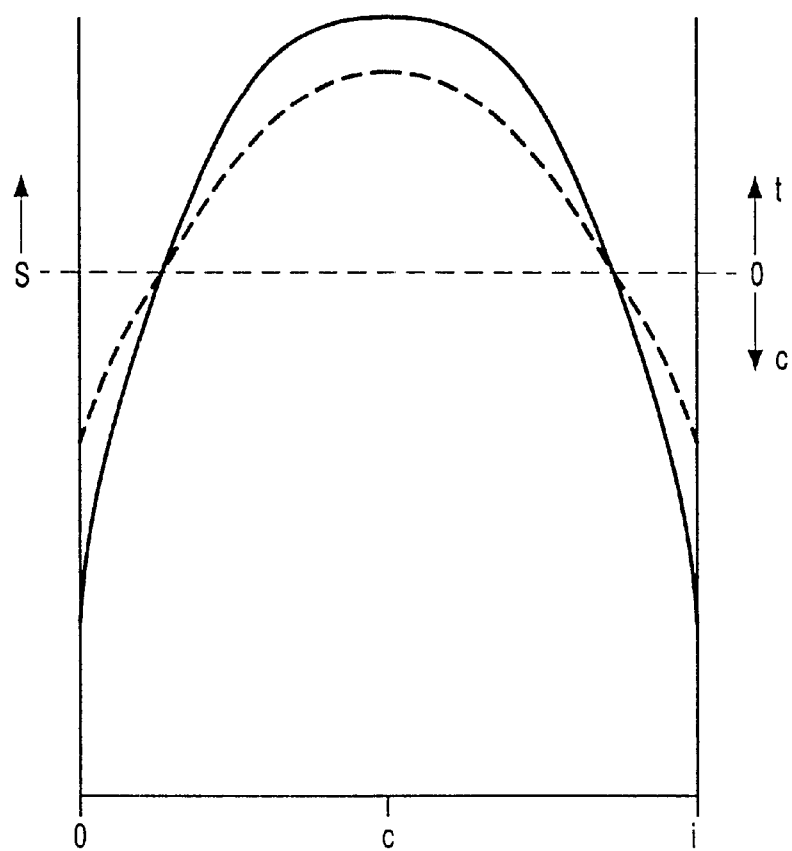
FIG. 4 illustrates, in a graphical form, the stresses inside the glass panel.

FIG. 4 shows graphically the stress (s) induced in the glass panel over the thickness d of the glass panel 3.

The solid line shows the stress level in a glass panel as made by means of the method in accordance with the invention, while the broken line shows a glass panel made by means of a conventional method. Any stress below the zero line is compressive (c), and tensile (t) above the line. When the two lines are compared, it becomes clear that the method in accordance with the invention provides a very high compressive stress at and near the outer (o) and inner (i) surface of the glass panel. This increase of compressive stress effectively counteracts the stresses that occur when the CRT is evacuated. It is important within the concept of the invention that this compressive stress is not released. Therefore, no annealing step is performed after reforming. Furthermore, the faster the decrease of temperature, the higher the surface compression.

Figure 5:
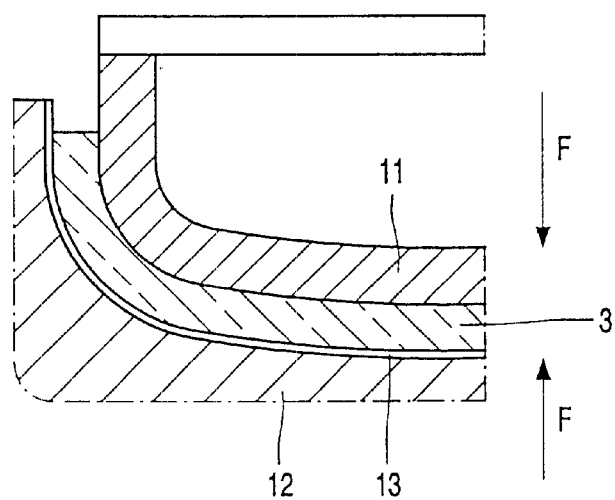
FIG. 5 shows schematically a reforming press with means to increase heat transfer from the glass panel to the reforming press.

FIG. 5 schematically shows a reforming press. The press comprises a plunger 11 and a mould 12 in between which the glass panel 3 is reformed. The plunger and the mould are pressed together at a reforming pressure F, schematically indicated by arrows in FIG. 5. In this example, one of the dies (the mould) is provided with a cloth 13 to improve heat transfer. The same or a similar cloth may be provided between the glass panel 3 and the plunger 11. The press, or at least the dies (plunger and mould) are held at a temperature at or below $T_2$.

It will be clear to a person skilled in the art that many variations are possible within the scope of the invention. In summary, the invention can be described as follows.

To increase the strength of the glass panel of a CRT, the temperature of the glass panel is reduced during reforming from a temperature above preferably at least 30° C. above the annealing point, to a temperature well below, preferably at least 80° C. below the strain point. This induces high surface compression in the glass panel, paired with a low rate of compaction. The glass panel is subsequently not subjected to the usual annealing step.

We claim:

1. A method of manufacturing a cathode ray tube, in which method a glass display panel is press-formed, reheated and subsequently reformed, wherein, prior to reforming said glass panel is reheated to a first temperature above the annealing point and, during reforming, the temperature of said glass panel is reduced to a second temperature below the strain point and said glass panel is not subsequently annealed.

2. The method of claim 1, wherein said second temperature is at least 80° C. below the strain point.

3. The method of claim 1, wherein said first temperature is at least 30° C. above the annealing temperature.

4. The method of claim 1, wherein the reduction of temperature is effected within 5 minutes.

5. The method of claim 1, wherein said reforming step is performed in a reforming press held at or below said second temperature.

6. The method of claim 5, wherein said reforming press is provided with means to increase heat transfer from said glass panel to said reforming press.

* * * * *